(12) United States Patent
Hoo et al.

(10) Patent No.: US 7,729,378 B2
(45) Date of Patent: Jun. 1, 2010

(54) ROBUST HIGH-THROUGHPUT FRAME FOR LOW-QUALITY WIRELESS CHANNEL CONDITIONS

(75) Inventors: Min Chuin Hoo, Mountain View, CA (US); Rajendra Tushar Moorti, Mountain View, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 754 days.

(21) Appl. No.: 11/504,905

(22) Filed: Aug. 16, 2006

(65) Prior Publication Data
US 2007/0064735 A1 Mar. 22, 2007

Related U.S. Application Data

(60) Provisional application No. 60/713,633, filed on Sep. 2, 2005.

(51) Int. Cl.
*H04J 3/16* (2006.01)
(52) U.S. Cl. ...................... 370/471; 375/267
(58) Field of Classification Search ................ 370/471, 370/334; 375/260, 267, 259; 329/304; 455/522
See application file for complete search history.

(56) References Cited

U.S. PATENT DOCUMENTS

| | | | |
|---|---|---|---|
| 2001/0046266 A1* | 11/2001 | Rakib et al. | 375/259 |
| 2003/0076165 A1* | 4/2003 | Furman et al. | 329/304 |
| 2003/0231715 A1* | 12/2003 | Shoemake et al. | 375/267 |
| 2004/0082356 A1* | 4/2004 | Walton et al. | 455/522 |
| 2005/0078707 A1* | 4/2005 | Maltsev et al. | 370/471 |
| 2005/0220209 A1* | 10/2005 | Lewis | 375/267 |
| 2005/0286474 A1* | 12/2005 | van Zelst et al. | 370/334 |
| 2007/0183515 A1* | 8/2007 | Lim et al. | 375/260 |

* cited by examiner

*Primary Examiner*—Ian N Moore
*Assistant Examiner*—Stephen W Brown
(74) *Attorney, Agent, or Firm*—Garlick, Harrison & Markison; Kevin L. Smith

(57) ABSTRACT

A transceiver device for processing a frame in a wireless local area network, where the frame is one of several frame formats, which include a high throughput frame format. The transceiver device receives a frame having a training sequence, a signal field and a data payload, and processes the training sequence to detect which signal field length of a plurality of signal field lengths was used in the received frame. With the signal field length, the device processes the signal field based upon the detected signal field length to retrieve the data payload processing information.

12 Claims, 10 Drawing Sheets

ROBUST HIGH-THROUGHPUT FRAME FOR LOW-QUALITY WIRELESS CHANNEL CONDITIONS

CROSS-REFERENCE TO RELATED APPLICATION

This application claims priority to U.S. Provisional Application Ser. No. 60/713,633 filed Sep. 2, 2005, which is hereby incorporated herein by reference in its entirety for all purposes.

BACKGROUND

1. Technical Field

The present invention relates to wireless communications and, more particularly, to high-throughput frames for low-rate transmission environment.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services ("AMPS"), digital AMPS, global system for mobile communications ("GSM"), code division multiple access ("CDMA"), local multi-point distribution systems ("LMDS"), multi-channel-multi-point distribution systems ("MMDS"), and/or variations thereof.

Depending on the type of wireless communication system, a wireless communication device, such as a cellular telephone, two-way radio, personal digital assistant ("PDA"), personal computer ("PC"), laptop computer, home entertainment equipment, et cetera. communicates directly or indirectly with other wireless communication devices. For direct communications (also known as point-to-point communications), the participating wireless communication devices tune their receivers and transmitters to the same channel or channels (for example, one of a plurality of radio frequency ("RF") carriers of the wireless communication system) and communicate over that channel(s). For indirect wireless communications, each wireless communication device communicates directly with an associated base station (for example, for cellular services) and/or an associated access point (for example, for an in-home or in-building wireless network) via an assigned channel. To complete a communication connection between the wireless communication devices, the associated base stations and/or associated access points communicate with each other directly, via a system controller, via a public switch telephone network ("PSTN"), via the Internet, and/or via some other wide area network.

Each wireless communication device includes a built-in radio transceiver (that is, receiver and transmitter) or is coupled to an associated radio transceiver (for example, a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency ("IF") stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

One problem is increasing data throughput of a system under low-quality, or unfavorable, channel conditions. Under favorable channel conditions, higher, yet less robust, modulation transmission rates are used to transmit high-throughput frames. The higher modulation transmission rates generally have a multi-bit transmission capacity that allows more information to be transmitted within a given time span. Under low-quality channel conditions, a more robust, but slower modulation rate is used to improve the error rate that would increase using a higher modulation transmission rate. But the lower modulation transmission rates do not have multi-bit transmission capability, yet the additional information needed for the high-throughput frame needs to be conveyed with minimal processing overhead. Proposed techniques had been to statically increase the frame structure size. The increases, however, correspond to processing overhead increases under both low-quality and higher quality channel conditions. What is needed, therefore, is a technique to adjust a high-throughput frame based on the channel quality in wireless communication systems.

SUMMARY OF THE INVENTION

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
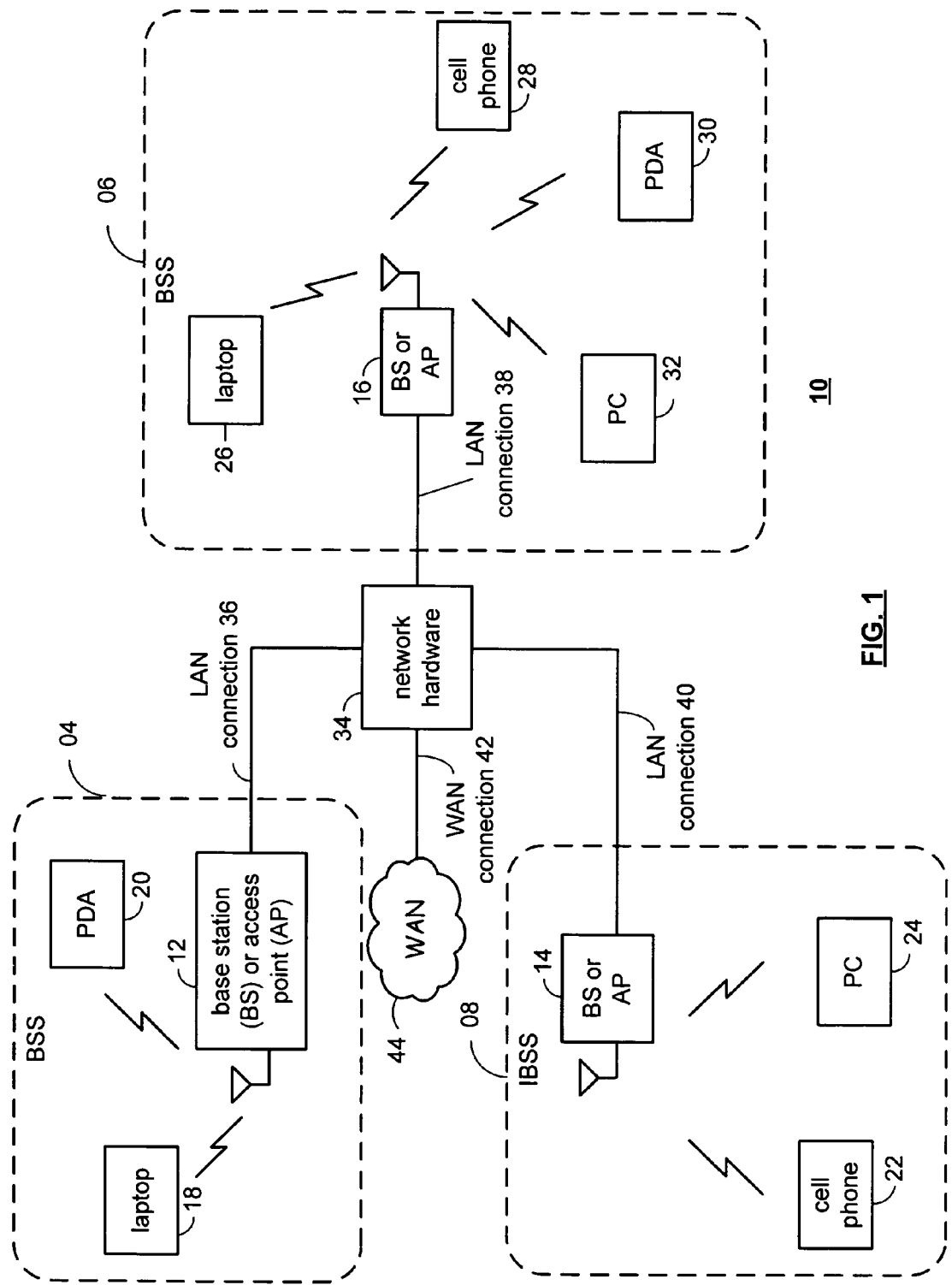
FIG. 1 is a functional block diagram illustrating a communication system that includes circuit devices and network elements and operation thereof according to an embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a communication system or network 10. Communication system 10 includes a plurality of base stations or access points ("APs") 12, 14, and 16, a plurality of wireless communication devices 18, 20, 22, 34, 26, 28, 30, and 32, and a network hardware component 34. The wireless communication devices 18, 20, 22, 34, 26, 28, 30, and 32 may be laptop computers 18 and 26, personal digital assistants 20 and 30, personal computers 24 and 32 and/or cellular telephones 22 and 28. The details of the wireless communication devices will be described in greater detail with reference to FIGS. 2 through 10.

The base stations or APs 12, 14, and 16 are operably coupled to the network hardware component 34 via local area network ("LAN") connections 36, 38 and 40. The network hardware component 34, which may be a router, switch, bridge, modem, system controller, etc., provides a wide area network ("WAN") connection 42 for the communication system 10 to an external network element such as WAN 44. Each of the base stations or access points 12, 14, and 16 has an associated antenna or antenna array to communicate with the wireless communication devices in its area. Typically, the wireless communication devices 18 through 32 register with the particular base station or access points 12, 14, and 16 to receive services from the communication system 10. For direct connections (that is, point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. Because the channel conditions between the devices in the network service areas 04, 06, and 08 vary, the base stations or access points within a network service area have the ability to provide high-rate, high-throughput frames in favorable channel conditions, and low-rate, high-throughput frames in unfavorable channel conditions. The frame structures, including enhanced signal field types and associated indicators, provide for high-throughput data under varying channel conditions.

Figure 2:
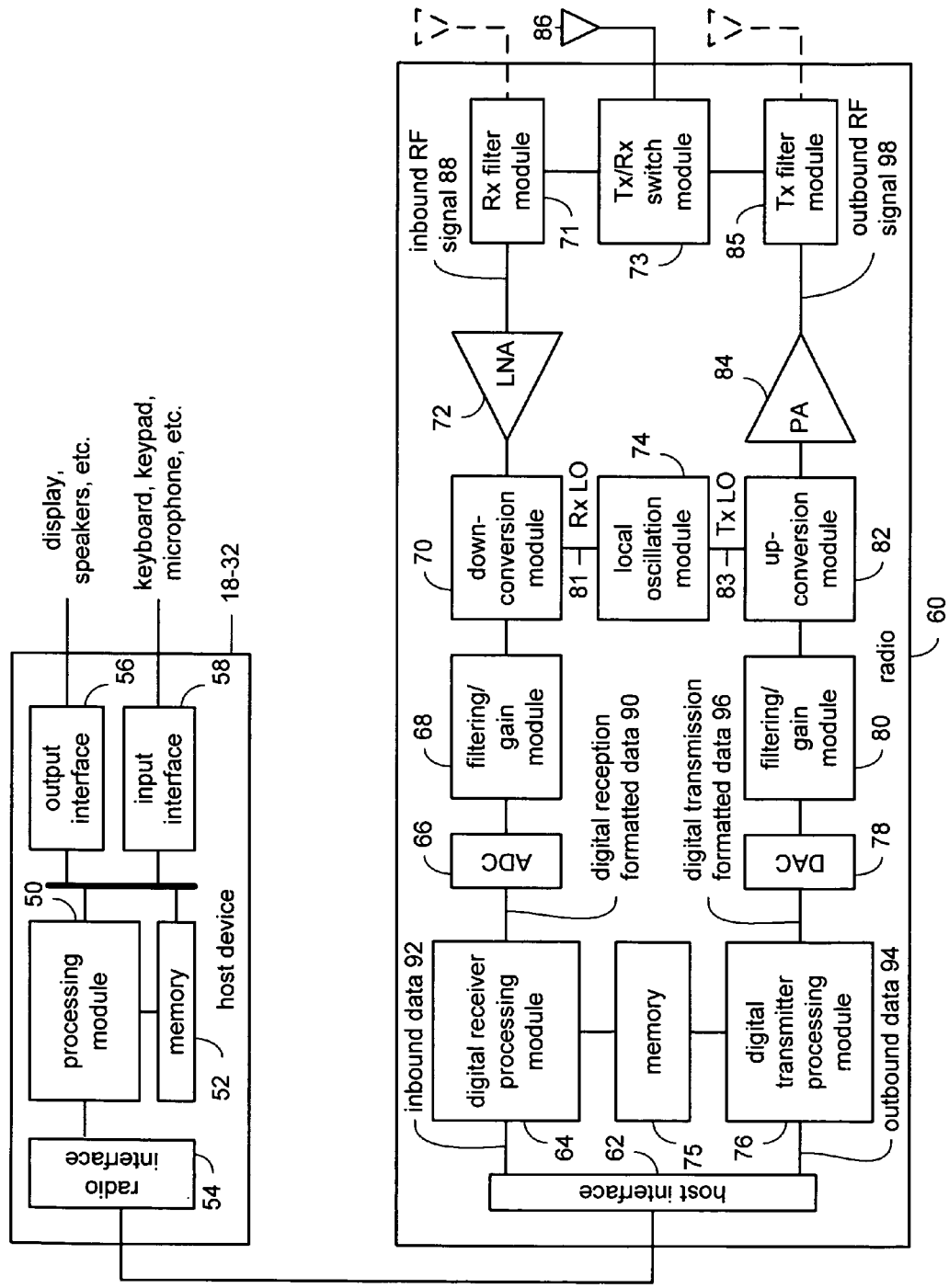
FIG. 2 is a schematic block diagram illustrating a wireless communication host device and an associated radio according to an embodiment of the invention.

FIG. 2 is a schematic block diagram illustrating a wireless communication host device 18 through 32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18 through 32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (for example, inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver ("Tx/Rx") switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital receiver functions also include indicator detection for enhanced signal field types of a received frame transmitted under favorable or unfavorable channel conditions. Indicator detection is discussed in detail with reference to FIGS. 4 through 10. The digital transmitter functions include, but are not limited to, scrambling, encoding, constellation mapping, and modulation. Digital receiver processing module 64 and transmitter processing module 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information.

Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host devices 18 through 32 via host interface 62. Host interface 62 routes outbound data 94 to digital transmitter processing module 76, which processes outbound data 94 in accordance with a particular wireless communication standard or protocol (for example, IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal. Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18 through 32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
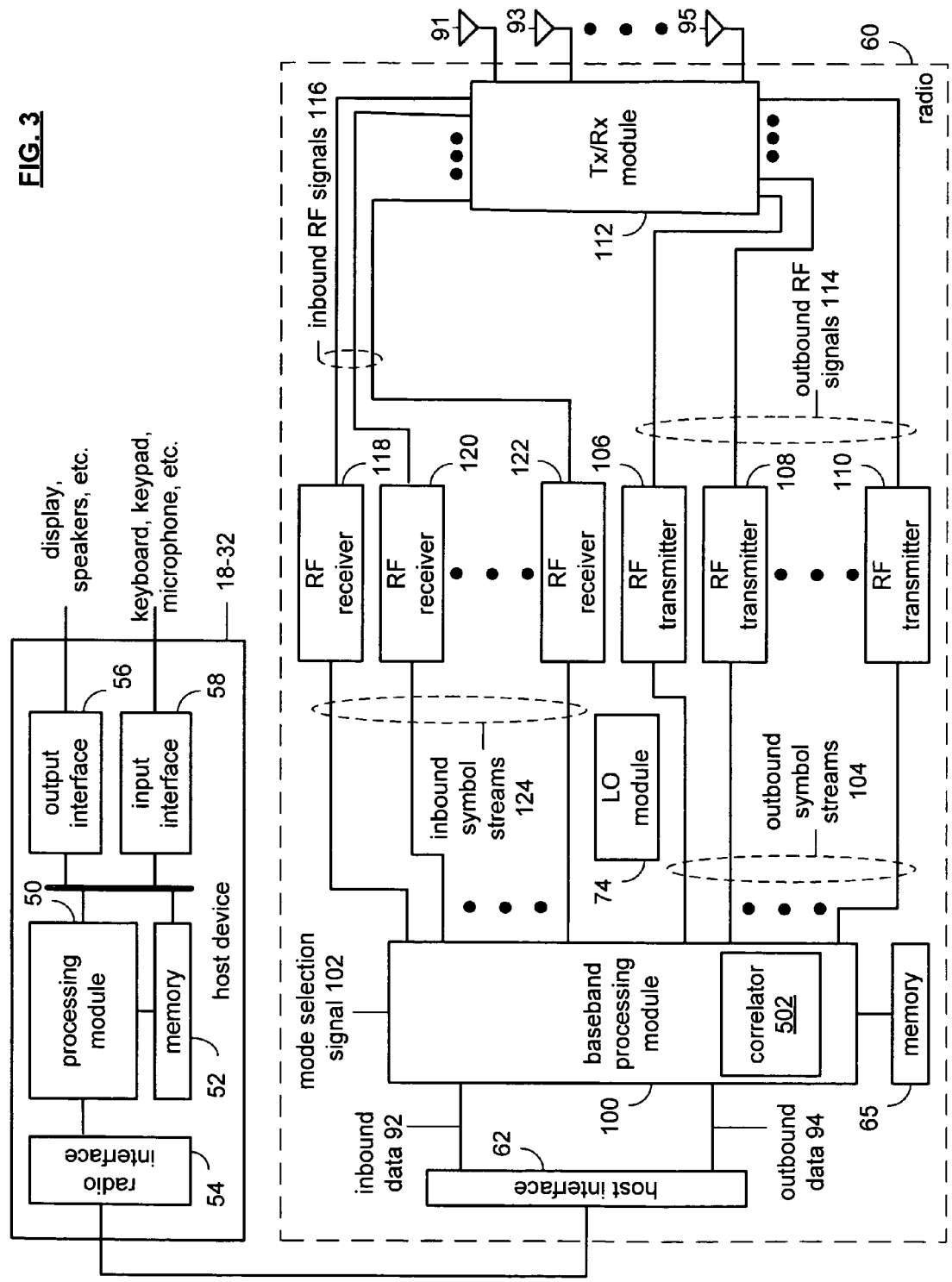
FIG. 3 is a schematic block diagram illustrating a wireless communication device that includes a host device and an associated radio according to an embodiment of the invention.

FIG. 3 is a schematic block diagram illustrating a wireless communication device that includes the host device 18 through 32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18 through 32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (for example, inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58 the processing module 50 may perform a corresponding host function on the data and/or route it to the radio 60 via the radio interface 54.

Radio 60 includes a host interface 62, a baseband processing module 100, memory 65, a plurality of radio frequency ("RF") transmitters 106, 108, and 110, a transmit/receive ("Tx/Rx") module 114, a plurality of antennas 91, 93, through 95, a plurality of RF receivers 118 through 122, and a local oscillation module 74. The baseband processing module 100, in combination with operational instructions stored in memory 65, executes digital receiver functions and digital transmitter functions, respectively. The digital receiver functions include, but are not limited to, digital intermediate frequency ("IF") to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, Binary Phase Shift Keying ("BPSK"), Quadrature Phase Shift Keying ("QPSK"), Complementary Code Keying ("CCK"), 16 Quadrature Amplitude Modulation ("QAM") and/or 64 QAM. The mode selection signal 102 may also include a code rate, a number of coded bits per subcarrier ("NBPSC"), coded bits per OFDM symbol ("NCBPS"), and/or data bits per OFDM symbol ("NDBPS"). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates two, three, or four antennas, the baseband processing module 100 will produce two, three, or four outbound symbol streams 104 from the outbound data 94.

Depending on the number of outbound symbol streams 104 produced by the baseband processing module 100, a corresponding number of the RF transmitters 106, 108, through 110 will be enabled to convert the outbound symbol streams 104 into outbound RF signals 114. In general, each of the RF transmitters 106 through 110 includes a digital filter and upsampling module, a digital-to-analog conversion module, an analog filter module, a frequency up conversion module, a power amplifier, and a radio frequency bandpass filter. The RF transmitters 106 through 110 provide the outbound RF signals 112 to the transmit/receive module 114, which provides each outbound RF signal to a corresponding antenna 91 through 95.

When the radio 60 is in the receive mode, the transmit/receive module 112 receives one or more inbound RF signals 116 via the antennas 81 through 85 and provides them to one or more RF receivers 118 through 122. The RF receiver 118 through 122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18 through 32 via the host interface 62. Also, the baseband processing module 100 includes a correlator 502 to detect indicators for enhanced signal field types of a received frame, which is transmitted under favorable or unfavorable channel conditions. Indicator detection is discussed in detail with reference to FIGS. 4 through 10.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
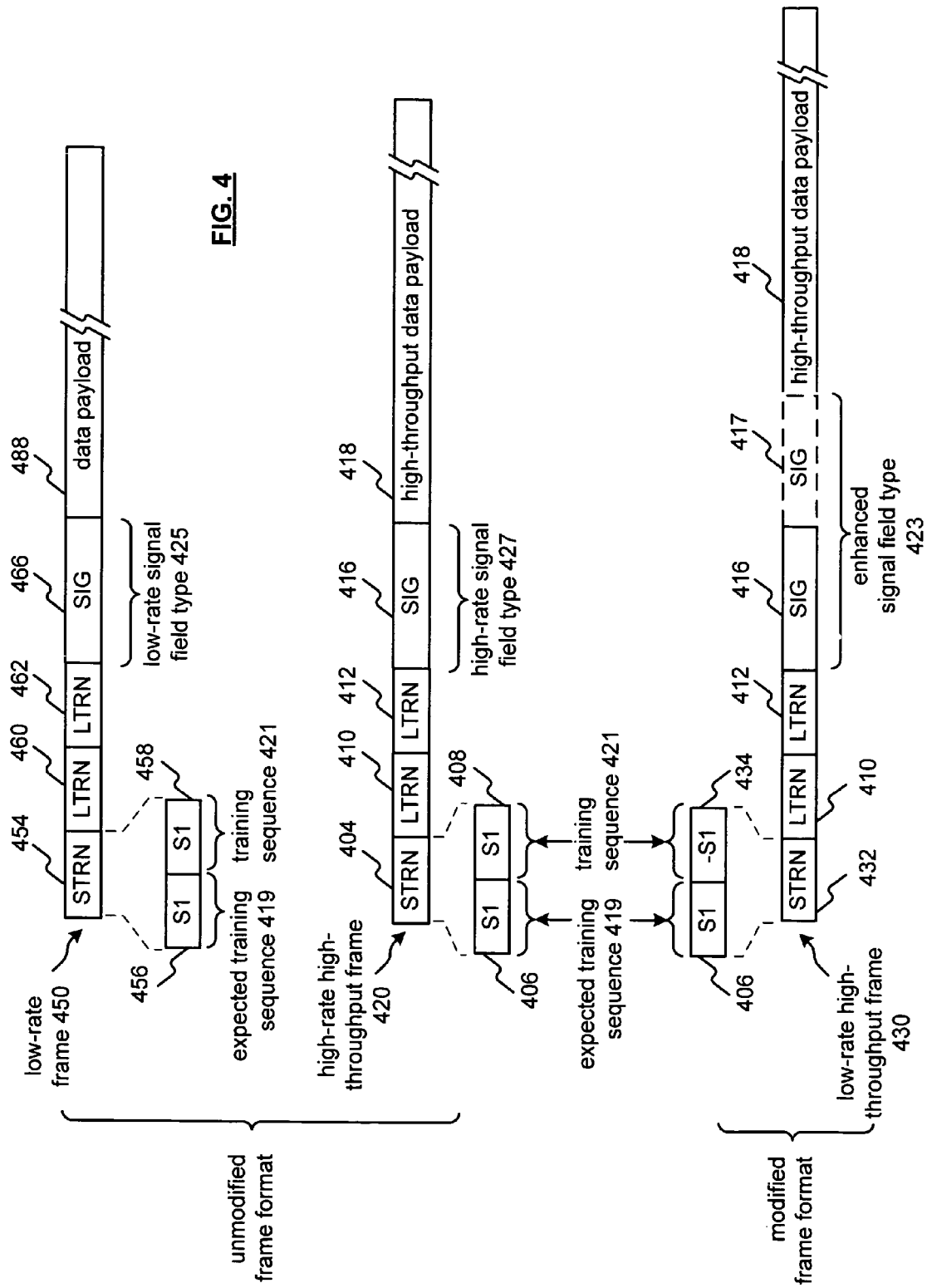
FIG. 4 illustrates a high-throughput frame format modification for low rate transmission of high-throughput frames according to an embodiment of the invention.
Figure 5:
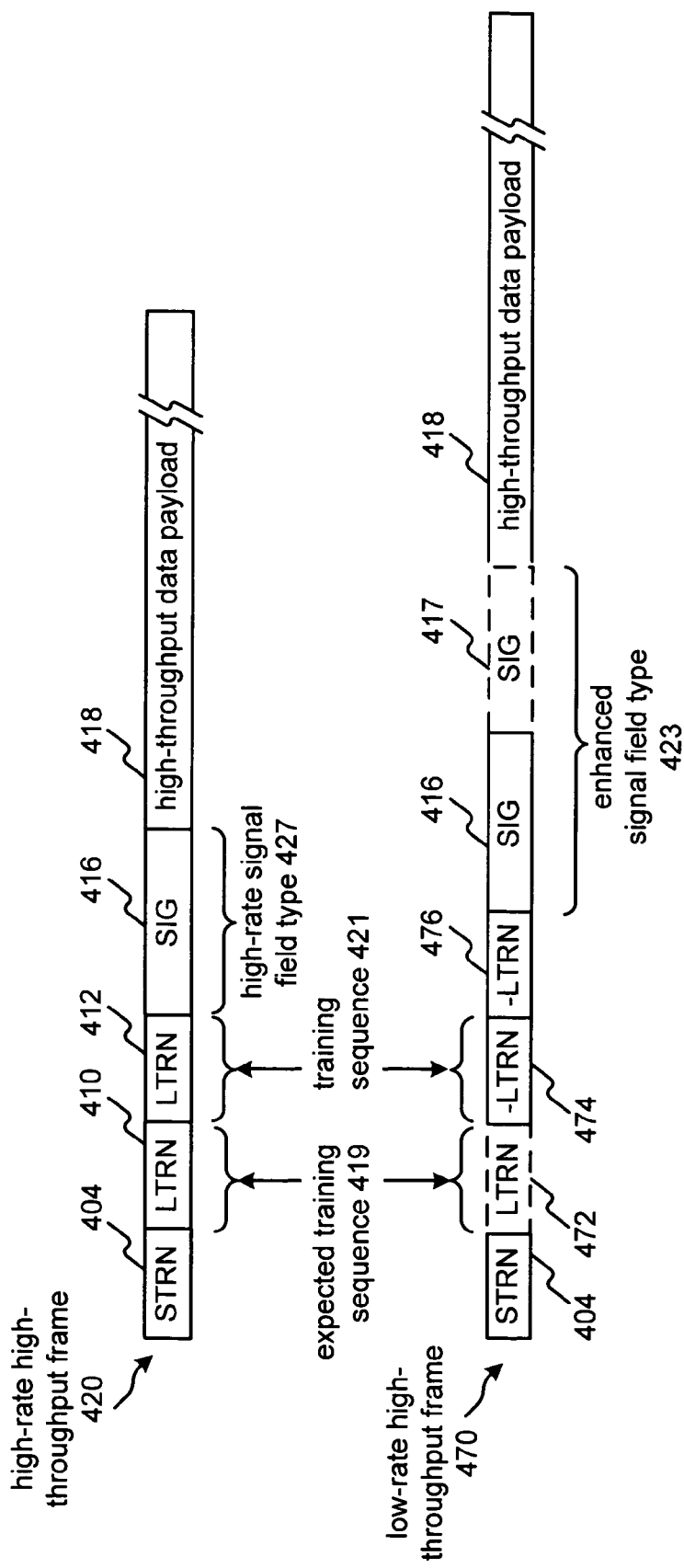
FIG. 5 illustrates another frame format modification for low rate transmission of high-throughput frames according to an embodiment of the invention.
Figure 6:
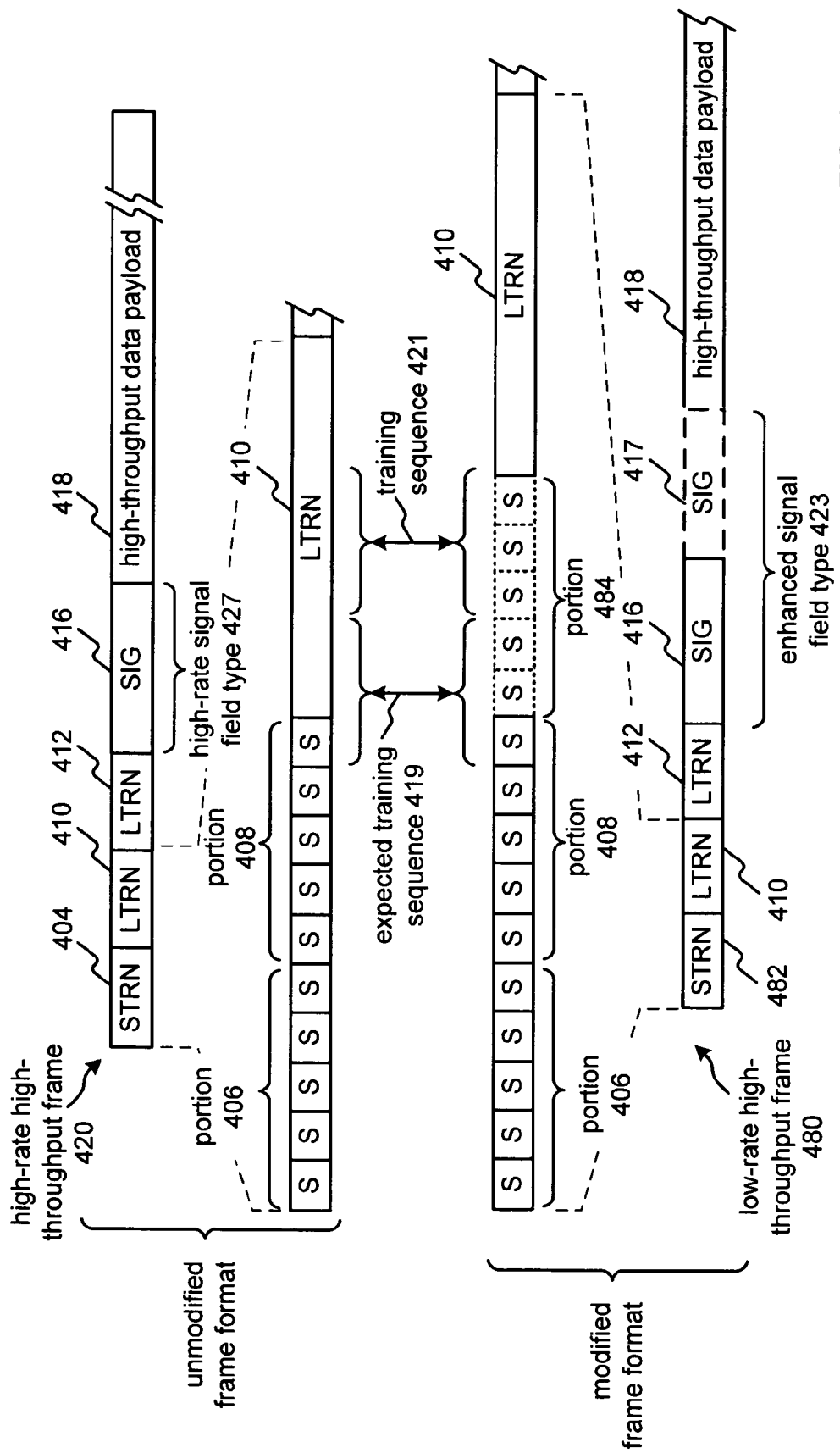
FIG. 6 illustrates yet another frame format modification for low rate transmission of high-throughput frames according to an embodiment of the invention.

FIGS. 4 through 6 illustrate high-throughput frame modifications for signal field type indicators of a frame based upon modulation transmission rates. The signal field type allows robust reception of high-throughput data under favorable channel conditions as well as unfavorable channel conditions.

Generally, high-throughput frames support data rates that can exceed 100 mega-bits-per-seconds ("Mbps"), as compared to 20 Mbps under present WLAN standards specifications. High-throughput data rates can be realized through use of multiple antenna systems for frame transmission and receiving, and the structure of a high-throughput frame. For instance, MIMO systems provide a "rich" multipath having M antennas at a transmitter and M antennas at a receiver to provide M times the peak throughput of a single-input-single-output ("SISO") system without increasing the frequency bandwidth. This is performed by dividing the channel into multiple "spatial channels" through which independent data streams can be transmitted, known as "spatial multiplexing." The modulation transmission rate selected for a frame, however, corresponds to the predicted wireless channel quality as seen by a receiver. One form of channel quality indicator is the signal to noise ratio ("SNR") for the received data. The lower the received SNR (that is, the poorer the wireless channel quality), the more difficult it is for a receiver to accurately decode a received signal. The SNR for the wireless channel, however, is affected over time by channel variables such as path loss, signal fading, and signal interference. Examples of other channel quality indicators include signal strength, symbol error rate, bit error rate, et cetera.

Generally, a frame is made up of a preamble training sequence and a data payload. Generally, the configuration settings for the data payload such as length, rate, modulation type and number of spatial streams are contained in the signal field, which may be a part of the preamble training sequence. Because the configuration settings are necessary for decoding the associated data payload, the signal field is encoded using a robust modulation type (for example, BPSK modulation).

A tradeoff exists, however, between the processing overhead and signal-field robustness to the channel variables. For example, when the selected modulation type to encode the signal field is BPSK, the configuration settings for the associated data payload are conveyed through the wireless channel over two symbols. In contrast, when the selected modulation type to encode the signal field is QPSK, which is a higher-rate but still considered a robust modulation type, then the configuration settings can fit in one symbol (as compared to two symbols under BPSK), which minimizes the frame overhead.

The tradeoff, however, for a QPSK-encoded signal field is that the low-end sensitivity of a receiver is limited because QPSK modulation requires a higher SNR in comparison to BPSK modulation to achieve equivalent decoding accuracy. That is, under low SNR conditions where the data payload can only support BPSK, having a QPSK-encoded signal field will result in increased signal-field decoding errors and consequently increased frame errors.

Because frame overhead is not an issue for low-rate (such as BPSK modulation) high-throughput frames, a compromise is to encode the signal field using BPSK for these types of frames, while encoding the signal field with QPSK for higher-rate (QPSK, 16 QAM, 64 QAM) high-throughput frames where overhead becomes an issue. A modified preamble training sequence for the transmitted frame indicates the modulation type encoding used for the signal field. As a result, the modulation type of the signal field may differ among the various frame formats.

A receiver, without a priori knowledge of the underlying frame formats, must process the preamble sequence for a frame to determine the existence of the modulation type indication to determine the signal-field modulation type. The resulting determined modulation-type is used to decode the signal field contents, which are then used for further processing and/or decoding of the associated data packet, such as by a digital receiver processing module, to provide outbound data for use by a host device.

For varying channel conditions, rate adaptation dynamically switches modulation transmission rates to accommodate varying channel conditions. The modulation transmission rate is selected based upon the predicted channel quality to provide optimum data throughput. Modulation involves translating the data stream into a sequence of symbols. Each symbol may encode a certain number of bits, the number depending on the modulation scheme. The symbol sequence is then transmitted at a symbol rate. The data rate is determined by the number of encoded bits per symbol. High-rate modulation schemes (for example QPSK modulation having two encoded bits per symbol) use denser modulation encodings but are less robust under low SNR conditions, while low-rate modulation schemes (for example, BPSK modulation having one encoded bit per symbol) use less denser modulation encodings that are more robust and provide less errors under low SNR conditions. Accordingly, low-rate modulation schemes have less capacity to convey data over a similar amount of time as a high-rate modulation scheme FIG. 4 illustrates a high-throughput frame format modification for data transmission within a communication system where the wireless channel quality varies over time. The frame formats include a low-rate frame 450, a high-rate high-throughput frame 420, and a low-rate high-throughput frame 430.

The low-rate frame 450 includes a short training sequence 454, long training sequences 460 and 462, a low-rate signal field type 425 that includes signal field 466, and a data payload 488. The high-rate high-throughput frame 420 includes a short training sequence 404, long training sequences 410 and 412, a high-rate signal field type 427 including a signal field 416, and a high-throughput data payload 418. The low-rate frame 450 and the high-rate high throughput frame 420 illustrate "standard" or "customary" training sequences for favorable transmission environments (such as those with a sufficient SNR for the receiver). As one of ordinary skill in the art may appreciate, the signal field type indicators may similarly be applied to other varying frame formats. The low-rate high-throughput frame 430 includes a short training symbol 432, long training sequences 410 and 412, an enhanced signal field type 423 including signal fields 416 and 417, and a high-throughput data payload 418. The low-rate high-throughput frame 430 illustrate a training sequence for unfavorable transmission environments (such as those with poor or unfavorable SNR for the receiver)

The training sequences provide data synchronization process at a receiver. In general, the short training symbols STRN (generally about 10 periods of 0.8 microseconds each in one embodiment of the invention) are used to detect the start-of-frame, gain control sequence (to place the signal in a range suitable for detection), carrier frequency offset ("CFO"), symbol recovery, etc. The long training symbol LTRN (for example, in OFDM techniques, generally having 2 periods of a training symbol each being four microseconds) provide information for channel estimation and fine improvements to receiver performance. The signal fields contain configuration settings necessary for processing the data payload.

When the predicted channel quality is high, as may be reflected by a high SNR, then a high-rate modulation may be used to transmit the high-throughput frame 420. A high-throughput frame carries additional information than lower throughput frames to process the associated data payload, such as the modulation rate, the length of the data payload, number of spatial streams etc. Under a higher modulation rate (for example, QPSK), the high-rate signal field type 427 has a four-microsecond time-span, which is sufficient to convey the data payload processing information (for example, a 104-bit block) under a high-rate modulation. This is because each symbol conveys two bits under a QPSK modulation rate.

When the predicted channel quality is low, as may be reflected by a low SNR, then a low rate modulation (for example, BPSK) may be used to transmit a frame having a high-throughput data payload. To ensure that the signal field is just as robust as the payload, the signal field is BPSK-encoded as well. Under BPSK, however, each symbol only conveys one bit. An OFDM symbol with fifty-two BPSK-encoded sub-symbols (such as in wireless LAN device) can only convey fifty-two bits—an insufficient number of bits to convey all the necessary processing information for decoding a high-throughput frame. Accordingly, the frame is modified to double the signal field length for an enhanced signal field.

The low-rate high-throughput frame 430 shows modifications to the high-rate high-throughput frame 420 for transmission and reception of a high-throughput data payload 418 at a low-rate modulation such as BPSK modulation. The modifications include lengthening the signal field to provide an enhanced signal field type 423 and an indicator associated with the enhanced signal field type 423. The details of determining the presence of the enhanced signal field type will be discussed with reference to FIGS. 7 and 8.

The enhanced signal field type 423 includes the signal field 416 and the signal field 417, designated by dashed lines, that increases the signal field length to carry the data payload processing information for a high-throughput data payload 418. For example, the four microsecond, 52-bit block, associated with the signal field 416 is increased to an eight microsecond time span, providing a signal field capable of conveying up to 104-bits of data under the low-rate modulation scheme.

The frame 430 includes an indication to a receiver the presence of the enhanced signal field type 423. The indication is provided through the expected training sequence 419 and the training sequence 421, which the receiver processes to determine the presence of the enhanced signal field type 423. The expected training sequence 419 is provided by the short training sequence portion 406, and the training sequence 421 is provided by the short training sequence portion 434. The indication of the enhanced signal field type 423 is provided by the negation of the portion 408

The data payload 488 of the low-rate frame 450 is not a high-throughput payload, and does not have the additional processing information associated with the high-throughput data payload 418. Accordingly, an enhanced signal field type indication is not provided in the short training sequence portion 456 for the expected training sequence 419 or the short training sequence portion 458 for the training sequence 421.

FIG. 5 illustrates another frame format modification for low rate transmission of high-throughput frames. The frame formats include a high-rate high-throughput frame 420, and a low-rate high-throughput frame 470. The low-rate high-throughput frame 470 includes a short training sequence 404, long training sequences 472, 474, and 476, an enhanced signal field type 423 that includes signal fields 416 and 417, and a high-throughput data payload 418.

The low-rate high-throughput frame 480 shows modifications to the high-rate throughput frame 420 for transmission and reception of a high-throughput data payload 418 at a low-rate modulation such as a BPSK modulation scheme. The modifications include lengthening the signal field to provide an enhanced signal field type 423, which is indicated through the addition of a long training sequence 472, as indicated in the dashed lines, and the negation of the long training sequences 474 and 476. The training sequences are shown in simplified form for purposes of discussion. The training sequences may include, or have inserted therebetween, additional fields, such as guard intervals, cyclic prefixes, et cetera.

The expected training sequence 419 and the training sequence 421 are correlated to determine the presence of the enhanced signal field type 423. The expected training sequence 419 is provided by the long training sequence 472, and the training sequence 421 is provided by the long training sequence 474. The details of determining the presence of the enhanced signal field type will be discussed with reference to FIGS. 7 through 10.

FIG. 6 illustrates yet another frame format modification for low rate transmission of high-throughput frames. The frame formats include a high-rate high-throughput frame 420, and a low-rate high-throughput frame 480. The low-rate high-throughput frame 480 includes a short training sequence 482 that includes portions 406, 408, and 484, long training sequences 410 and 412, an enhanced signal field type 423 that includes signal fields 416 and 417, and a high-throughput data payload 418.

The low-rate high-throughput frame 480 provides for transmission and reception of a high-throughput data payload 418 at a low-rate modulation such as BPSK. The enhanced signal field type 423 is a block that includes the signal field 416 and the signal field 417, indicated by dashed lines, to increase the length of the signal field to carry information for processing the high-throughput data payload 418.

The frame 480 includes an indication to a receiver the presence of the enhanced signal field type 423. The indication for the low-rate high-throughput frame 480 is the lengthening of the short training sequence 482 with the addition of the portion 484, designated by the dashed lines. The expected training sequence 419 and the training sequence 421 are defined by the short training sequence portions 408 and 484.

Generally, the preamble sections of a frame that coincide with the expected training sequence 419 and the training sequence 421, which are processed to indicate whether there is an enhanced signal field type 423 for the modified frame format 430 or a high-rate signal field type 427 or a low-rate signal field type 425 of unmodified frame formats 450 and/or 420. The processing may be carried out via a correlation process to determine whether an enhanced signal field type 423 is present. The details of determining the presence of the enhanced signal field type will be discussed with reference to FIGS. 7 through 10.

Figure 7:
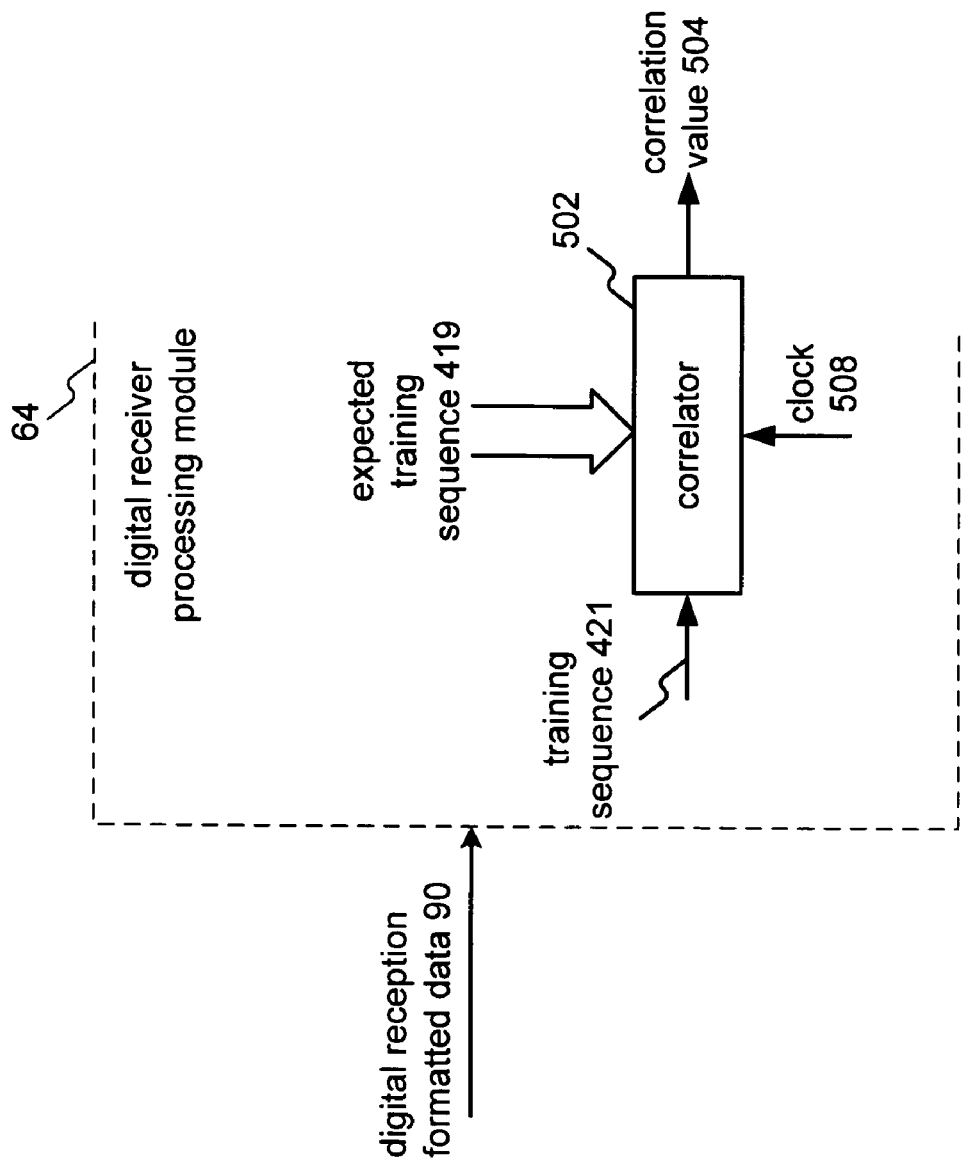
FIG. 7 is a schematic block diagram of a digital receiver processing module according to an embodiment of the invention.

FIG. 7 is a schematic block diagram of a digital receiver processing module 64 that includes a correlator 502. Generally, the digital receiver processing module 64 searches for symbols contained within the training sequences of a received frame so as to synchronize or "lock to" a received transmission. The digital reception formatted data 90 includes the training sequence symbols that are provided to the digital receiver processing module 64.

The correlator 502 is clocked by a clock 508 that controls the comparison between the expected training sequence 419 and the training sequence 421. The comparison of the expected training sequence 419 and the training sequence 421 within the correlator 502 produce a correlation value 504.

In operation, when a low-rate modulation is used for a frame, the correlator 502 correlates the expected training sequence 419 with the training sequence 421 to determine the existence of the indication of the presence of an enhanced signal field type. The choice of which preamble sections constitute the expected training sequence 419 and the training sequence 421 depend upon the modification of the preamble to indicate the presence of an enhanced signal field type.

Generally, two preamble sections 419 and 421 correlated together will be N samples apart. This separation is referred to as the lag between the two preamble sections. The expected training sequence 419 (the first section) of the preamble is chosen to be the section of the preamble where gain settling and coarse frequency offset correction have occurred to provide a reliable first correlation value. The training sequence 421 follows the expected training sequence 419 by N samples. The correlation span relates to the number of samples that the correlator 502 processes. More samples in the correlation span corresponds to more processing gain and a more reliable the correlation value to detect the enhanced signal field type. The correlation may be performed on those frames where a short training symbol is negated, such as that described with respect to FIG. 4, where a long training symbol addition and negation combination is used such as that described with respect to FIG. 5, and/or where a short training field is added, such as that described with respect to FIG. 6.

With respect to the negation of the training sequences illustrated by the low-rate high-throughput frame 430 (see FIG. 4) and frame 470 (see FIG. 5), the correlation result 504 between the expected training sequence 419 and the training sequence 421 would provide a negative correlation value, indicating an enhanced signal field type 423 for a received frame. In contrast, the correlation result 504 between the expected training sequence 419 and the training sequence 421 of the high-rate high-throughput frame 420 (FIG. 5) or the low-rate frame 450 (FIG. 4) or the high-rate high-throughput frame 420 (FIG. 4) would provide a non-negative correlation value or a much lower negative correlation value, indicating the absence of an enhanced signal field type 423 for a received frame.

An example where a high positive correlation value 50 indicates that the signal field is an enhanced signal field type 423 is provided with respect to the low-rate high-throughput frame 480 (see FIG. 6). For example, the correlation result 504 of the expected training sequence 419 correlated with the training sequence 421 of the low-rate high-throughput frame 480 would provide a high positive correlation value in view of the symmetry provided by the short training symbol portions 408 and 484, indicating an enhanced signal field type 423 (see FIG. 6). In contrast, the comparison result 504 of the expected training sequence 419 correlated with the training sequence 421 of the high-rate high-throughput frame 420 would provide a much lower correlation value 504 in view of the asymmetry of the expected training sequence 419 and training sequence 421. The much lower correlation value 504 indicates a high-rate signal field type 427 having a smaller signal field length (for example, one symbol spanning four-microseconds 4µs). As one of ordinary skill in the art may appreciate, correlation processes may be conducted on the preamble portions using sequence blocks, sectional portions of the sequence blocks, et cetera. Correlation examples for the frame format examples of FIG. 6 are discussed in detail with reference to FIG. 8.

It should be noted that although a correlator 502 is used for determining the signal field length between an enhanced signal field type 423 and a low-rate signal field type 425, or a high-rate signal field type 427, other devices, such as a comparator, may be used to produce comparison results.

Figure 8:
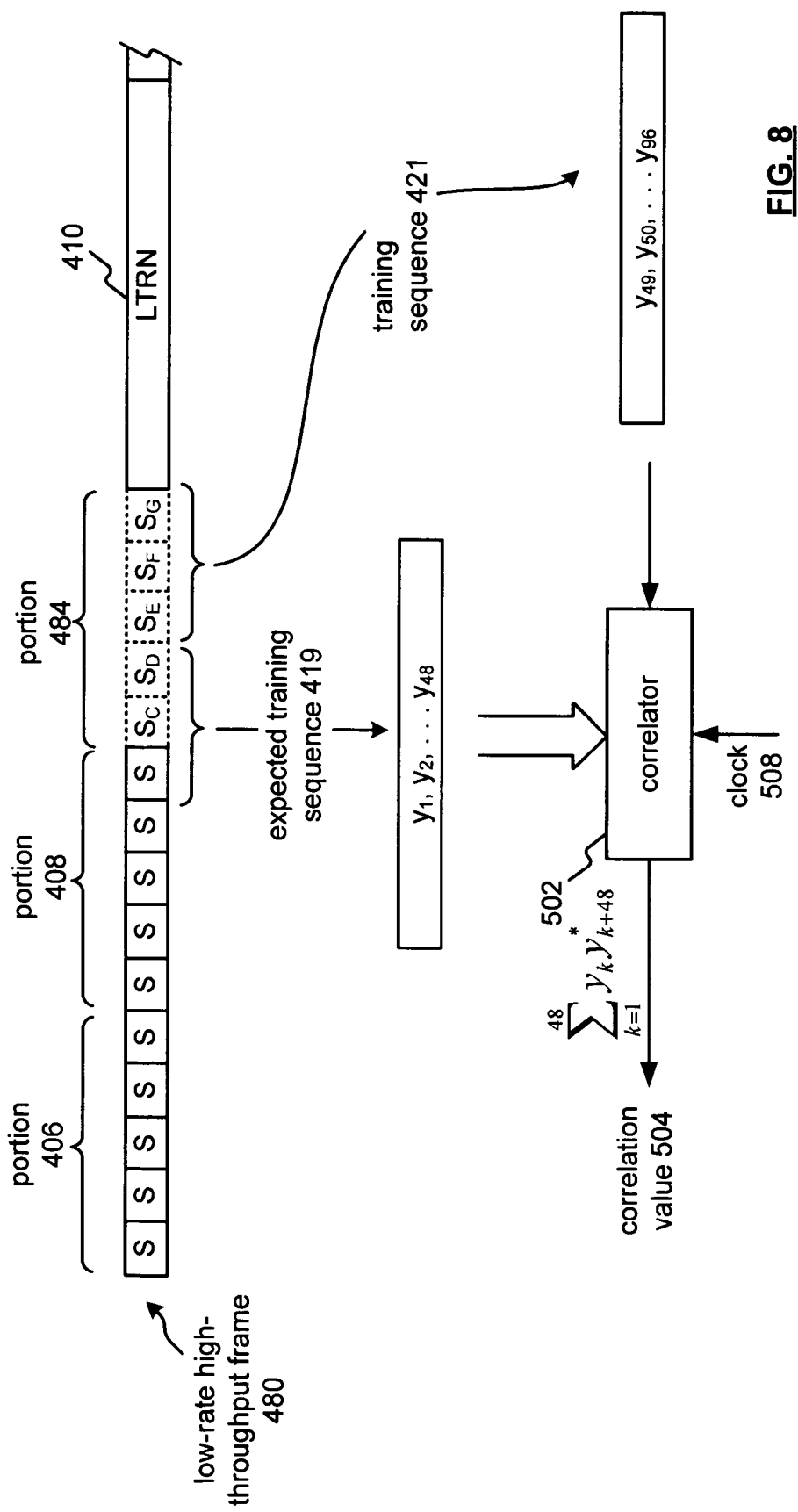
FIG. 8 illustrates a correlation process to determine the presence of an enhanced signal field type according to an embodiment of the invention.

FIG. 8 illustrates a correlation process using frame sequence blocks to determine the presence of an enhanced signal field type. The low-rate high-throughput frame 480 has an expected training sequence 419 and a training sequence 421 input to the correlator 502. In the present example, the number of samples N for each of the sections S is 16. Because the expected training sequence 419 and the training sequence 421 each have three sections, the correlation span for each sequence 419 and 421 is forty-eight samples. Accordingly, the expected training sequence 419 has samples $y_1, y_2, \ldots y_{48}$, and the training sequence 421 has samples $y_{29}, y_{50}, \ldots y_{96}$. The lag between the two preamble sections 419 and 421 is forty-eight samples.

The correlation value 504 for these two portions may then be represented as:

$$\sum_{k=1}^{48} y_k y_{k+48}^*$$

Another example for producing the correlation value 504 is where sections of the added short training field 484, represented as section components $S_C$, $S_D$, $S_E$, $S_F$, and $S_G$, are input to the correlator 502.

With the number of samples N for each of the sections being sixteen, then section $S_C$ equals $x_1, x_2, \ldots x_{16}$, section $S_D$ equals $x_{17}, x_{18}, \ldots x_{32}$, section $S_E$ equals $x_{33}, x_{34}, \ldots x_{48}$, section $S_F$ equals $x_{49}, x_{50}, \ldots x_{64}$, and section $S_G$ equals $x_{65}, x_{66}, \ldots x_{80}$. The correlation span then is sixty-four samples and the lag value is sixteen samples. The correlation is conducted at a greater granularity between the sections, such that the correlator 502 correlates section $S_C$ with section $S_D$, section $S_D$ with section $S_E$, section $S_E$ with section $S_F$, and section $S_F$ with section $S_G$. The higher granularity correlation may be represented as:

$$\sum_{k=1}^{64} x_k x_{k+16}^*$$

Figure 9:
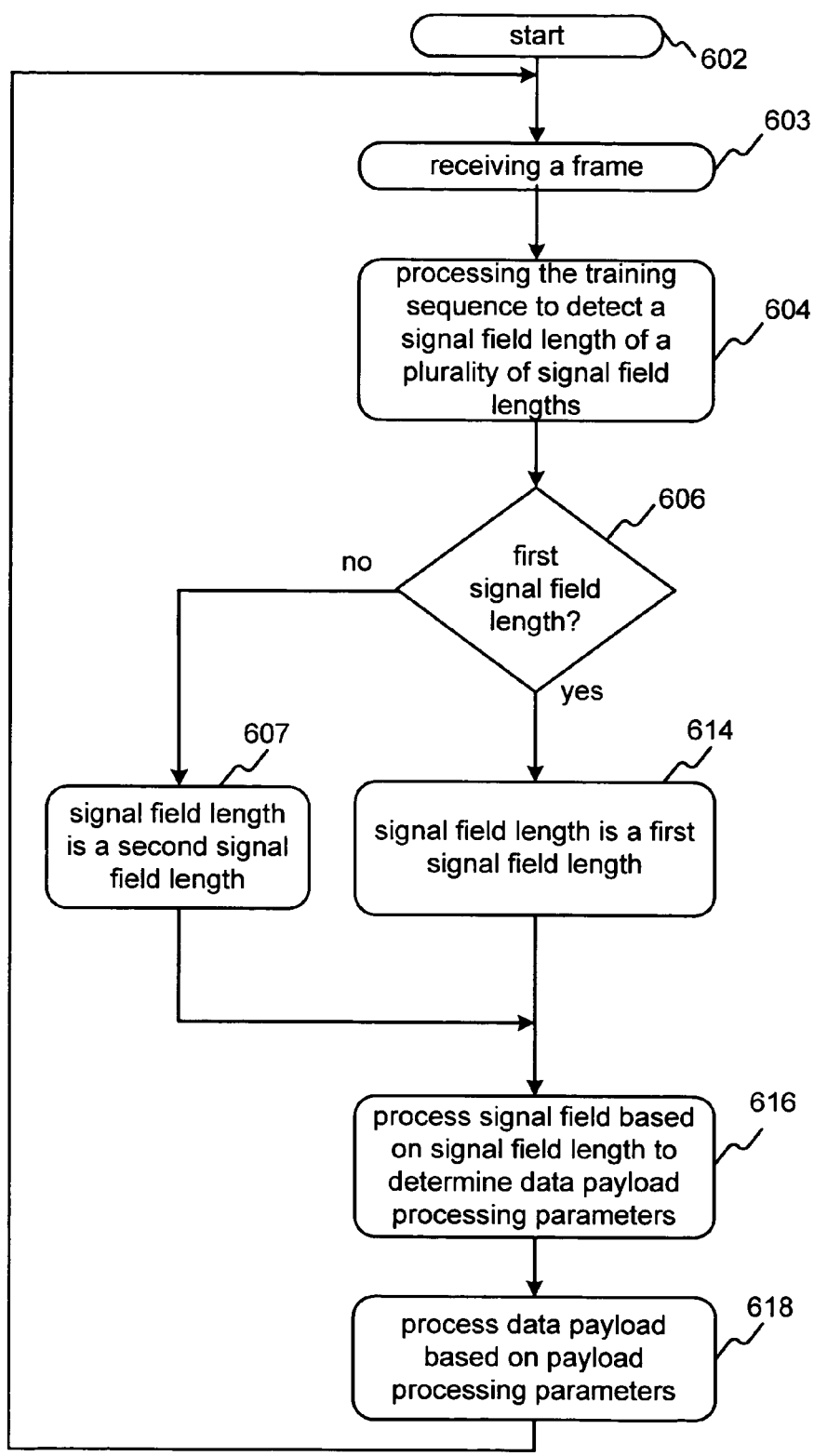
FIG. 9 is a flow chart illustrating a method of frame processing for a wireless local area network device according to an embodiment of the invention.

FIG. 9 is a flow chart illustrating a method for processing a frame having one of a plurality of frame formats for a wireless local area network device beginning at step 602. At step 603, a frame is received, where the frame includes a training sequence, a signal field and a data payload. The signal field includes data payload processing information used to access and extract the data contained within the data payload. At step 604, the device processes the training sequence to detect a signal field length of a plurality of signal field lengths. In general, the transmitting device may have inserted an enhanced signal field when a low-rate, or robust, modulation is used to increase the reliability of the transmission of the frame. When the detected signal field length is a first signal field length at step 606, then the signal field is a first signal field length at step 614. Otherwise, at step 607, the signal field length is a second signal field length. At step 616 the device processes the signal field based on the signal field length to determine the data payload processing parameters. By detecting the signal field length, the device has the flexibility to receive high-throughput frames in favorable as wells as in unfavorable transmission conditions. With the extraction of the data payload processing parameters, the device processes the data payload at step 618 to access and extract the data contained in the received frame.

Figure 10:
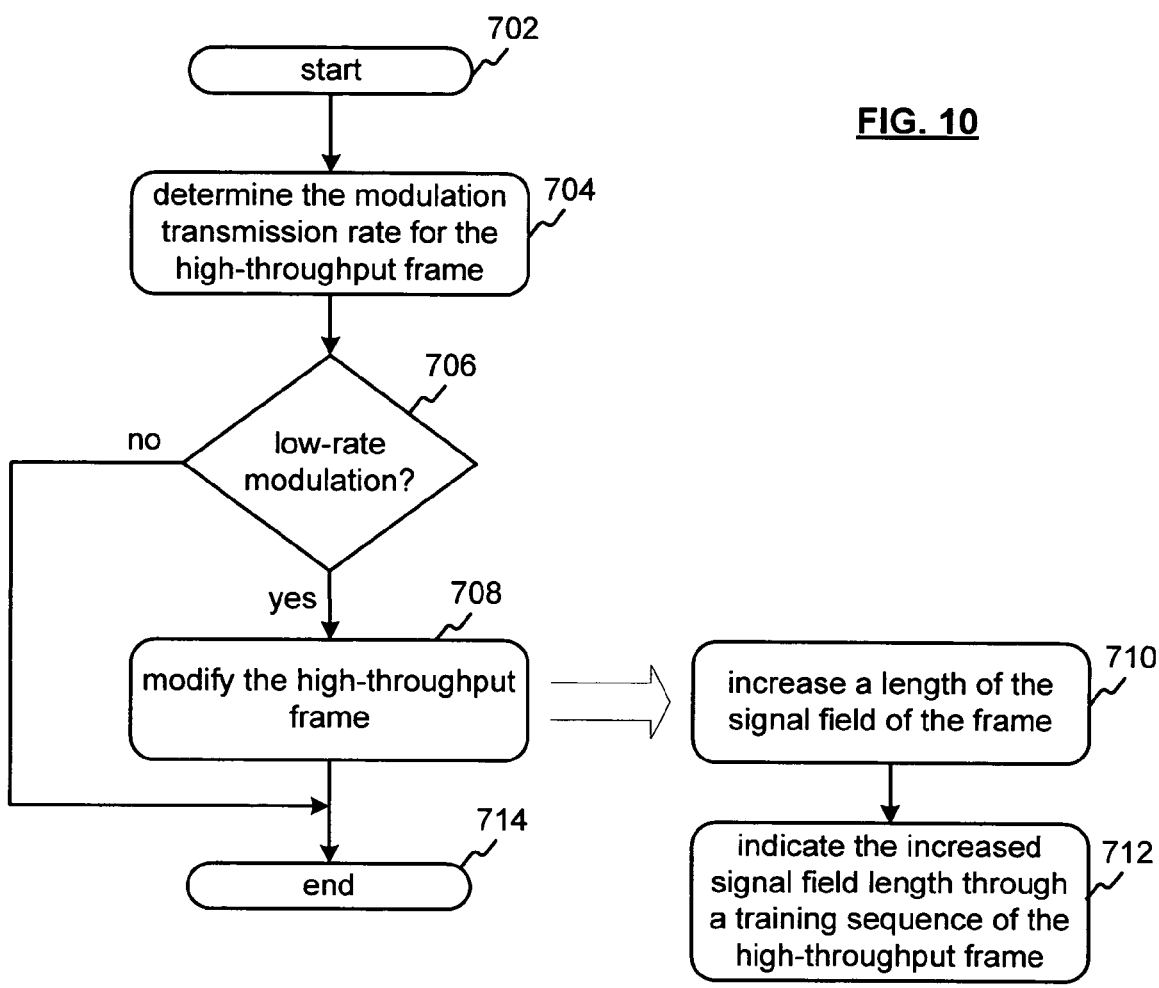
FIG. 10 is a flow chart illustrating a method for modifying a high-throughput frame based on a modulation transmission rate according to an embodiment of the invention.

FIG. 10 is a flow chart illustrating a method for modifying a high-throughput frame based on a modulation transmission rate beginning at step 702. The modulation transmission rate is determined for the high-throughput frame at step 704. When, at step 706, the modulation transmission rate is a low-rate modulation (for example BPSK), and the high-throughput frame is modified at step 708. As shown in FIG. 10, the frame is modified by increasing a length of the signal field of the frame at step 710, and by indicating the increased signal field length through a training sequence of the high-throughput frame at step 712. Returning to the main path, the method ends at step 714.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (for example, an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A method of processing a frame for a wireless communications network, the frame having one of a plurality of frame formats that include a high throughput frame format, the method comprises:
    receiving, via a baseband receiver module, a frame having a training sequence, a signal field and a data payload wherein the signal field includes data payload processing information;
    processing the training sequence to detect a signal field length of a plurality of signal field lengths used in the received frame, the training sequence processing includes:
        comparing at least a portion of the training sequence with at least a portion of an expected training sequence;
        upon a favorable comparison, determining that the signal field length is a first signal field length used in the received frame; and
        upon an unfavorable comparison, determining that the signal field length is a second signal field length used in the received frame;
    processing the signal field based upon the detected signal field length to retrieve the data payload processing information; and
    processing the data payload based upon the payload processing information.

2. The method of claim 1 wherein detecting the signal field length of the plurality of signal field lengths used in the received frame comprises:
    correlating a first portion of the training sequence with a second portion of the training sequence to produce a correlation value, wherein the correlation value indicates the signal field length of the plurality of signal field lengths used in the received frame.

3. The method of claim 1 wherein the training sequence comprises a plurality of long training sequences, wherein detecting the signal field length of the plurality of signal field lengths used in the received frame comprises:
    correlating at least a portion of a first long training sequence with at least a portion of a second long training sequence to produce a correlation value, wherein the correlation value indicates the signal field length of the plurality of signal field lengths used in the received frame.

4. The method of claim 1 wherein the training sequence comprises a plurality of short training sequences, wherein detecting the signal field length of the plurality of signal field lengths used in the received frame comprises:
    correlating at least a portion of a first short training sequence with at least a portion of the second short training sequence to produce a correlation value, wherein the correlation value indicates the signal field length of the plurality of signal field lengths used in the received frame.

5. A method for modifying a high-throughput frame based on a modulation transmission rate for transmission via a baseband transmitter module in a wireless communications network, the method comprises:
    determining the modulation transmission rate for the high-throughput frame; and
    when the modulation transmission rate is a low-rate modulation, modifying the high-throughput frame by:
        increasing a length of a signal field of the high-throughput frame sufficient to carry information for processing a data payload of the high-throughput frame; and
        indicating the increased length of the signal field through a modified training sequence of the high-throughput frame that includes a short training sequence with at least two portions and a plurality of long training sequences, by negating a portion of a short training sequence, or by negating at least one long training sequence of the plurality of long training sequences.

6. The method of claim 5 wherein determining the modulation transmission rate comprises conducting a rate negotiation with a receiver.

7. A baseband receiver module comprises:
    a processor; and
    memory operably coupled to the processor, wherein the memory includes operational instructions that prompt the processor to:
        receive a frame having a training sequence, a signal field and a data payload, wherein the signal field includes data payload processing information;
        process the training sequence to detect a signal field length of a plurality of signal field lengths used in the received frame, the training sequence processing includes: comparing at least a portion of the training sequence with at least a portion of an expected training sequence; upon a favorable comparison, determining that the signal field length is a first signal field length used in the received frame; and upon an unfavorable comparison, determining that the signal field length is a second signal field length used in the received frame; process the signal field based on the detected signal field length to retrieve the data payload processing information; and process the data payload based on the payload processing information.

8. The baseband receiver module of claim 7, wherein the memory further comprises operational instructions that prompt the processor to determine a type of the signal field by:
    correlating a first portion the training sequence with a second portion of the training sequence to produce a correlation value, wherein the correlation value indicates the signal field length of the plurality of signal field lengths used in the received frame.

9. The baseband receiver module of claim 7 wherein the training sequence comprises a plurality of long training sequences, wherein the memory further comprises operational instructions that prompt the processor to determine the signal field length of the plurality of signal field lengths used in the received frame by:
    correlate at least a portion of a first long training sequence with at least a portion of a second long training sequence to produce a correlation value, wherein the correlation value indicates the signal field length of the plurality of signal field lengths used in the received frame.

10. The baseband receiver module of claim 7 wherein the training sequence comprises a plurality of short training sequence portions, wherein the memory further comprises operational instructions that prompt the processor to determine the signal field length of the plurality of signal field lengths used in the received frame by:
    correlate at least a portion of a first short training sequence portion with at least a portion of a second short training sequence portion to produce a correlation value, wherein the correlation value indicates the signal field length of the plurality of signal field lengths used in the received frame.

11. A baseband transmitter module comprises:

a processor; and memory operably coupled to the processor, wherein the memory includes operational instructions that prompt the processor to:

modify a high-throughput frame based on a modulation transmission rate by:
    determining the modulation transmission rate for the high-throughput frame; and
    when the modulation transmission rate is a low-rate modulation, modify the high-throughput frame by:
        increasing a length of a signal field of the high-throughput frame sufficient to carry information for processing a data payload of the high-throughput frame; and
        indicating the increased length of the signal field through a modified training sequence of the high-throughput frame that includes a short training sequence with at least two portions and a plurality of long training sequences, by negating a portion of a short training sequence, or by negating at least one long training sequence of the plurality of long training sequences.

12. The baseband transmitter module of claim 11, wherein the memory further comprises operational instructions that prompt the processor to determine the modulation transmission rate by conducting a rate negotiation with a receiver.

* * * * *